(12) United States Patent
Lee

(10) Patent No.: US 6,948,408 B1
(45) Date of Patent: Sep. 27, 2005

(54) FLAT ENDED DOUBLE CUBE SHAPED TIPPED, SCREWDRIVER SYSTEM

(76) Inventor: Howard Lee, 331 Feasby Road, Uxbridge ON (CA) L0P 1R1

( * ) Notice: Subject to any disclaimer, the term of this patent is extended or adjusted under 35 U.S.C. 154(b) by 151 days.

(21) Appl. No.: 09/932,629

(22) Filed: Aug. 17, 2001

(51) Int. Cl.[7] .............................................. B25B 15/00
(52) U.S. Cl. ........................................ 81/436; 81/438
(58) Field of Search ......................... 81/436, 438, 439; 411/402, 403

(56) References Cited

U.S. PATENT DOCUMENTS

| | | | | |
|---|---|---|---|---|
| 975,285 | A | * | 11/1910 | Robertson .................... 411/403 |
| 2,397,216 | A | * | 3/1946 | Stellin ........................ 411/404 |
| 3,463,209 | A | * | 8/1969 | Podolsky ..................... 81/436 |
| 3,888,144 | A | * | 6/1975 | Parsons ........................ 81/436 |
| 4,258,596 | A | * | 3/1981 | Bisbing et al. ............. 411/403 |
| 4,380,942 | A | * | 4/1983 | Fenton ......................... 81/436 |
| 4,436,005 | A | * | 3/1984 | Hanson ....................... 81/439 |
| 5,351,586 | A | * | 10/1994 | Habermehl et al. ........... 81/438 |

\* cited by examiner

*Primary Examiner*—James G. Smith
(74) *Attorney, Agent, or Firm*—Edward P. Dutkiewicz

(57) ABSTRACT

A sure grip screwdriver system comprises a shaft. The shaft has a handle end and a working end. The shaft has a working inner portion and a working outer portion. The working inner portion is adjacent to the handle end. The working outer portion is adjacent to the working end. The working outer portion further has a generally cube-shaped configuration of a first smaller size. The working inner portion further has a generally cube-shaped configuration of a second larger size. Last provided is a shaft support. The shaft support has a recess at one end to receive the handle end of the shaft.

1 Claim, 3 Drawing Sheets

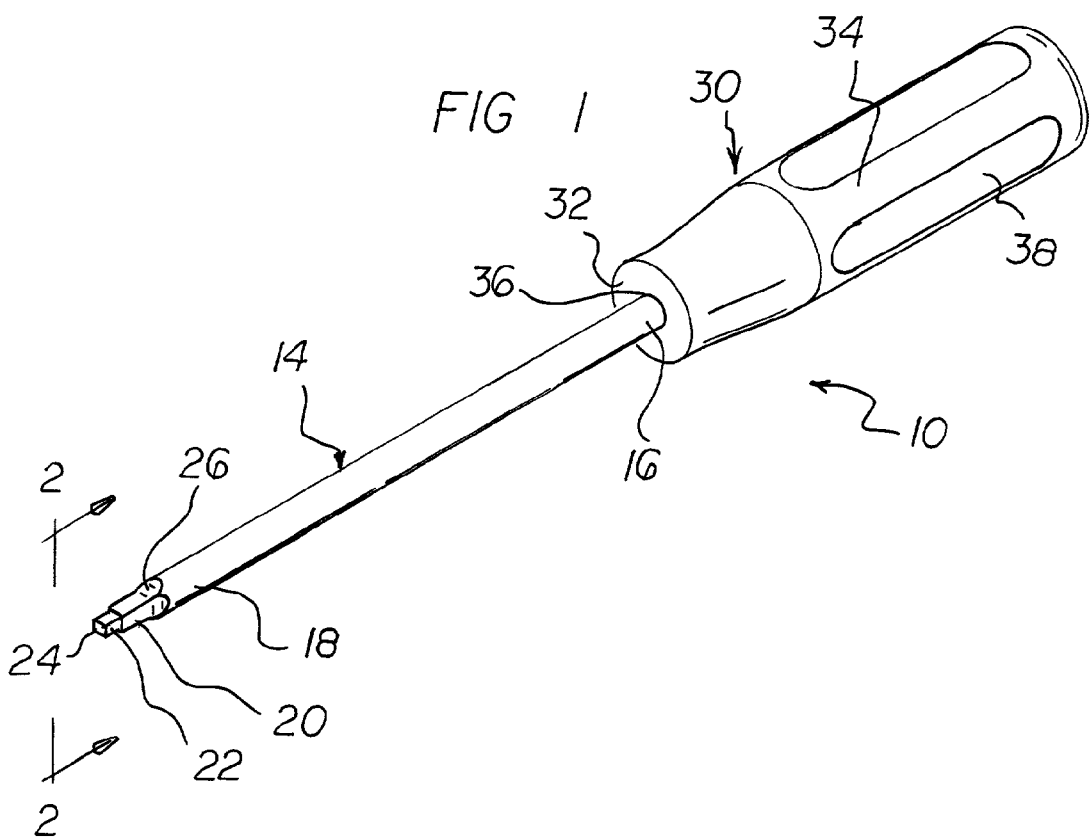
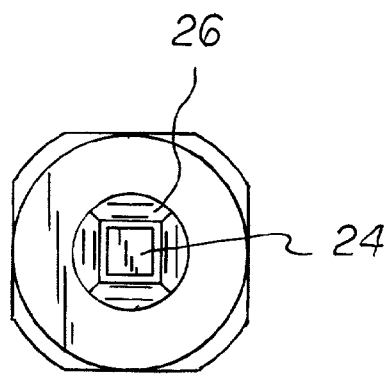

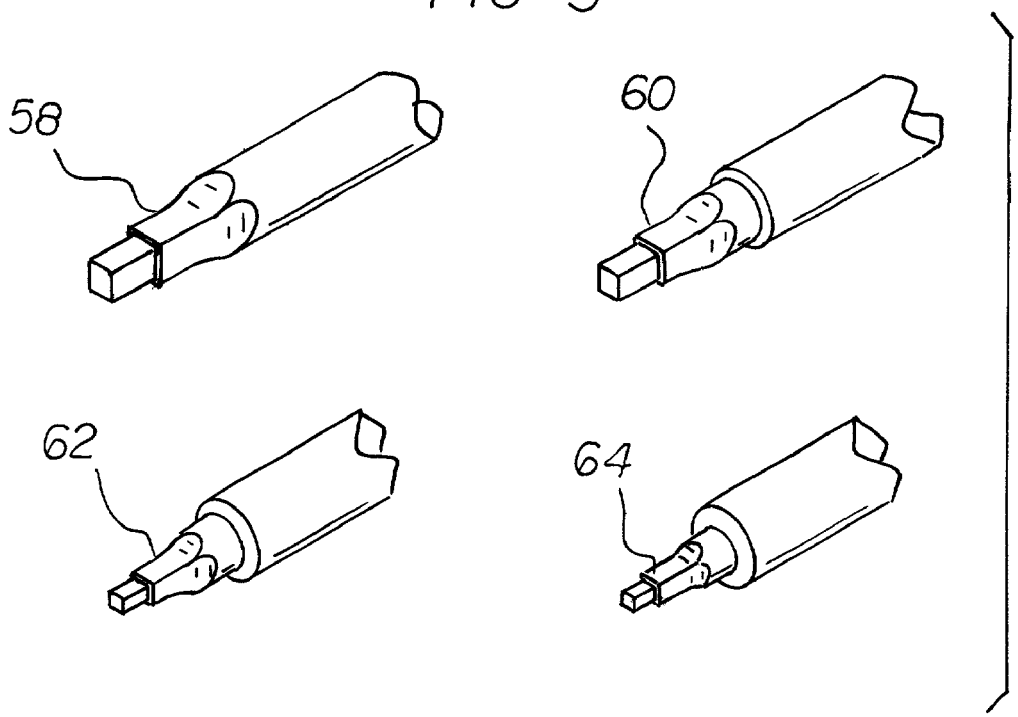
FIG 3
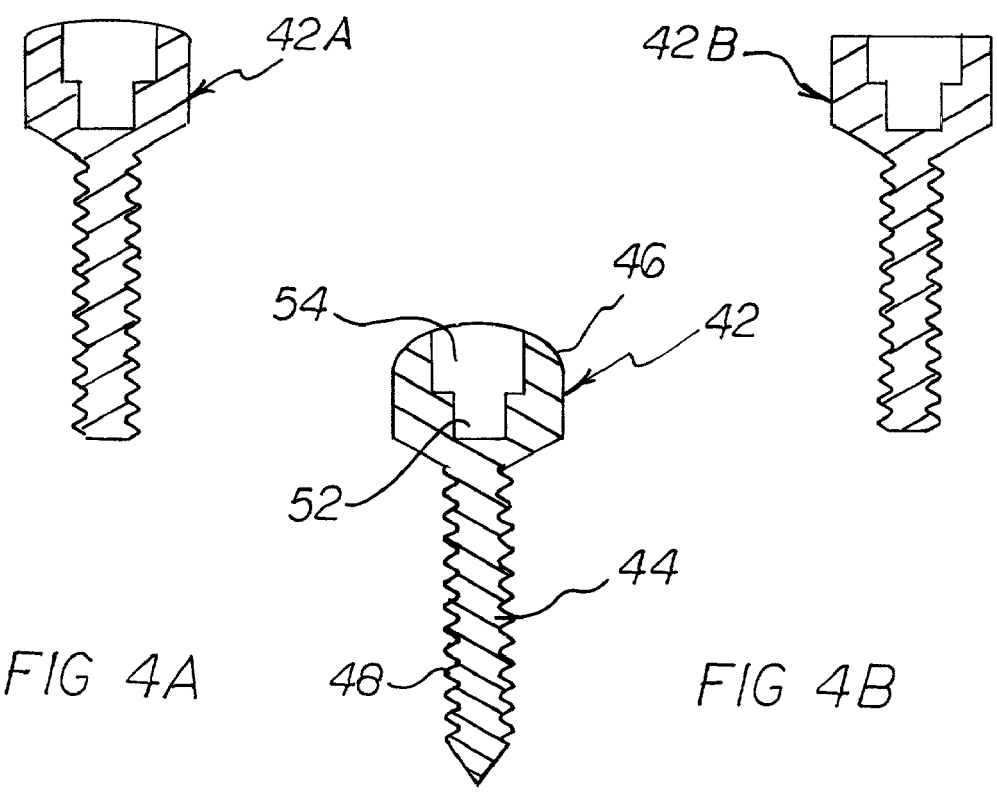
FIG 4A  FIG 4B
FIG 4

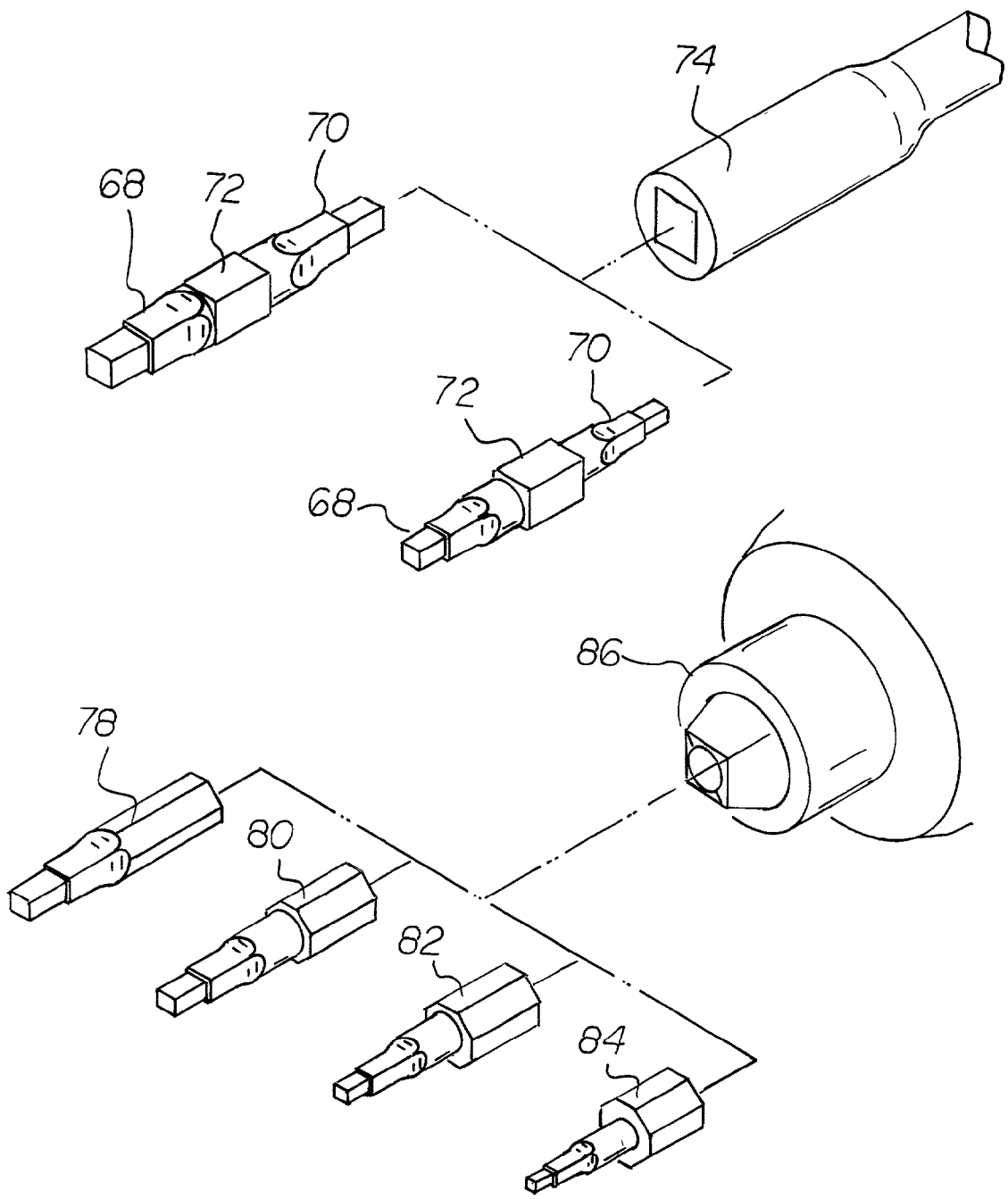

FLAT ENDED DOUBLE CUBE SHAPED TIPPED, SCREWDRIVER SYSTEM

BACKGROUND OF THE INVENTION

1. Field of the Invention

The present invention relates to a screwdriver system.

2. Description of the Prior Art

The use of tools of known designs and configurations is known in the prior art. More specifically, tools of known designs and configurations previously devised and utilized for the purpose of installing fasteners through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,640,175 discloses a ballistic shape screwhead and socket. U.S. Pat. No. 4,384,812 discloses a screw and screw forming tool. U.S. Pat. No. 4,911,593 discloses a ratchet driven threaded fastener U.S. Pat. No. 5,540,531 discloses a panel fastener. U.S. Pat. No. 5,460,064 discloses a universal socket tool. U.S. Pat. No. 5,674,037 discloses a screw having an improved head structure. Lastly, U.S. Pat. No. 5,709,137 discloses a torque clutched reversible ratchet wrench.

While these devices fulfill their respective, particular objectives and requirements, the aforementioned patents do not describe a sure grip screwdriver system that allows a user to screw and unscrew threaded fasteners in a convenient and efficient manner.

In this respect, the sure grip screwdriver system according to the present invention substantially departs from the conventional concepts and designs of the prior art, and in doing so provides an apparatus primarily developed for the purpose of allowing a user to screw and unscrew threaded fasteners in a convenient and efficient manner.

Therefore, it can be appreciated that there exists a continuing need for a new and improved sure grip screwdriver system which can be used for allowing a user to screw and unscrew threaded fasteners in a convenient and efficient manner. In this regard, the present invention substantially fulfills this need.

SUMMARY OF THE INVENTION

In view of the foregoing disadvantages inherent in the known types of tools of known designs and configurations now present in the prior art, the present invention provides an improved screwdriver system. As such, the general purpose of the present invention, which will be described subsequently in greater detail, is to provide a new and improved sure grip screwdriver system and method which has all the advantages of the prior art and none of the disadvantages.

To attain this, the present invention essentially comprises a shaft. The shaft is fabricated of a rigid metallic material. The shaft is in a cylindrical configuration with an axis. The shaft has a handle end and a working end. The shaft has a working inner portion. The working inner portion is adjacent to the handle end. The shaft further has a working outer portion. The working outer portion is adjacent to the working end. A flat cut face is provided on the outermost extent of the working end perpendicular to the axis of the shaft. The working outer portion has a generally cube-shaped configuration with a square cross section. The working outer portion further has an axial length of a first smaller size adjacent to the face. The working inner portion has a generally cube-shaped configuration with a square cross section. The working inner portion has an axial length of a second larger size adjacent to the working outer portion. A bevel is provided. The bevel is adjacent to the working inner portion remote from the face. Next provided is a screwdriver handle. The screwdriver handle has a shaft end. The screwdriver handle also has a gripping surface end. The shaft end has a generally cylindrical recess. In this manner the handle end of the shaft may be securely received and retained in one position. The gripping surface end has a plurality of axial indentations. The axial indentations facilitate the user's grip of the system. Last provided is a threaded fastener. The threaded fastener has a threaded portion. The threaded fastener also has a head portion. The threaded portion further has threads. The threads couple to a recipient surface upon rotation. The head portion has a cylindrical configuration with a central stepped recess. The stepped recess has a cube-shaped interior reception area and an exterior cube-shaped reception area. The interior reception area is smaller. In this manner the working outer portion of the shaft may be received snugly. The exterior reception area is larger. In this manner the working inner portion of the shaft may be received snugly. Alternatively, wherein the threaded fastener is of a smaller size, the working outer portion may be received snugly by the working outer portion. Another alternative relates to the working portions being of are of a larger size. In this manner, the working outer portion is may be snugly received by the working outer portion.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sure grip screwdriver system which has all of the advantages of the prior art tools of known designs and configurations and none of the disadvantages.

It is another object of the present invention to provide a new and improved sure grip screwdriver system which may be easily and efficiently manufactured and marketed.

It is further an object of the present invention to provide a new and improved sure grip screwdriver system which is of durable and reliable constructions.

An even further object of the present invention is to provide a new and improved sure grip screwdriver system which is susceptible of a low cost of manufacture with regard to both materials and labor, and which accordingly is then susceptible of low prices of sale to the consuming public, thereby making such sure grip screwdriver system economically available to the buying public.

Even still another object of the present invention is to provide a sure grip screwdriver system for allowing a user to screw and unscrew threaded fasteners in a convenient and efficient manner.

Lastly, it is an object of the present invention to provide a new and improved screwdriver system comprising a shaft. The shaft has a handle end and a working end. The shaft working inner portion is adjacent to the handle end. The working outer portion is adjacent to the working end. The working outer portion further has a generally cube-shaped configuration of a first smaller size. The working inner portion further has a generally cube-shaped configuration of a second larger size. A shaft support has a recess at one end to receive the handle end of the shaft. A threaded fastener has a threaded portion and a head portion. The head portion has a cylindrical configuration with a central stepped recess. The stepped recess has a cube-shaped interior reception are with a flat innermost portion and an exterior cube-shaped reception area with the interior reception area being smaller to snugly receive the working outer portion of the shaft and the flat innermost portion allowing a positive alignment of the fastener and the working tip and with the exterior reception area being larger to snugly receive the working inner portion of the shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a sure grip screwdriver system constructed in accordance with the principles of the present invention.

FIG. 2 is an end view of the sure grip screwdriver system shown in FIG. 1 taken along line 2—2 of FIG. 1.

FIG. 3 is a kit of working portions of a fastener system illustrating the use of different sizes.

FIG. 4 is a cross-sectional view of a fastener for use with the tools shown in the prior figures.

FIGS. 4A and 4B show alternate threaded fasteners adapted for use with the present invention.

FIG. 5 illustrates an alternate embodiment of the present invention with working portions on both sides of the shafts.

FIG. 6 is another alternate embodiment showing shafts with working portions operable in association with a power tool.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved sure grip screwdriver system embodying the principles and concepts of the present invention and generally designated by the reference numeral 10 will be described.

The present invention, the screwdriver system 10 is comprised of a plurality of components. Such components in their broadest context include a shaft and a shaft support and a fastener. Such components are individually configured and correlated with respect to each other so as to attain the desired objective.

First provided is a shaft 14. The shaft is fabricated of a rigid metallic material. The shaft is in a cylindrical configuration with an axis. The shaft has a handle end 16 and a working end 18. The shaft has a working inner portion 20. The working inner portion is adjacent to the handle end. The shaft further has a working outer portion 22. The working outer portion is adjacent to the working end. A flat cut face 24 is provided on the outermost extent of the working end perpendicular to the axis of the shaft. The working outer portion has a generally cube-shaped configuration with a square cross section. The working outer portion further has an axial length of a first smaller size adjacent to the face. The working inner portion has a generally cube-shaped configuration with a square cross section. The working inner portion has an axial length of a second larger size adjacent to the working outer portion. A bevel 26 is provided. The bevel is adjacent to the working inner portion remote from the face.

Next provided is a screwdriver handle 30. The screwdriver handle has a shaft end 32. The screwdriver handle also has a gripping surface end 34. The shaft end has a generally cylindrical recess 36. In this manner the handle end of the shaft may be securely received and retained in one position. The gripping surface end has a plurality of axial indentations 38. The axial indentations facilitate the user's grip of the system.

Last provided is a threaded fastener 42. The threaded fastener has a threaded portion 44. The threaded fastener also has a head portion 46. The threaded portion further has threads 48. The threads couple to a recipient surface upon rotation. The head portion has a cylindrical configuration with a central stepped recess. The stepped recess has a cube-shaped interior reception area 52 and an exterior cube-shaped reception area 54. The interior reception area is smaller. In this manner the working outer portion of the shaft may be received snugly. The exterior reception area is larger. In this manner the working inner portion of the shaft may be received snugly. Alternatively, wherein the threaded fastener is of a smaller size, the working outer portion may be received snugly by the working outer portion. Another alternative relates to the working portions being of are of a larger size. In this manner, the working outer portion is may be snugly received by the working outer portion.

Although FIG. 4 shows a screw with a rounded head as the preferred threaded fastener, it should be understood that any other type of threaded fastener could be used with the present invention. Consider, for example, the round headed bolt 42A of FIG. 4A as well as the flat headed bolt 42B of FIG. 4B. A flat headed screw could also be readily utilized.

In an alternate embodiment of the present invention, a plurality of shafts are provided. Each shaft is of a different sized working portion.

In another alternate embodiment of the present invention, the shaft of the system has opposed ends 68, 70. The opposed ends have working surfaces at each end. A central section 72 is provided. The central section has a square cross-sectional configuration for being received by the shaft support 74.

In still another alternate embodiment of the present invention, a plurality of shafts are provided. Each shaft is of a different sized working portion 78, 80, 82, 84. In this embodiment, the shaft support is a power tool 86.

As can be seen from above, the present invention includes a shaft with at least one working end in combination with a handle. The handle may be permanently coupled to the shaft as in FIG. 1. The shaft and handle may also be separably coupled as in FIGS. 5 and 6. It should also be realized that the handle may also be integrally fabricated with the shaft or simply formed as an extension of the shaft with a bend, preferably at 90 degrees, as is common with Allen's head wrenches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for fastening purposes comprising, in combination:

a shaft fabricated of a rigid metallic material in a cylindrical configuration with an axis and having a handle end and a working end, the shaft having a working inner portion and a working outer portion and with a square flat cut face on the outermost extent of the working end perpendicular to the axis of the shaft, the working outer portion having a generally cube-shaped configuration with a square cross section and an axial length of a first smaller size adjacent to the face, the working outer portion having four rectangular faces all in contact with and perpendicular to the square flat cut face of the shaft, the working inner portion having a generally cube-shaped configuration with a square cross section and an axial length of a second larger size adjacent to the working outer portion, with a bevel adjacent to the working inner portion remote from the square flat cut face;

a screwdriver handle having a shaft end and a gripping surface end, the shaft end having a generally cylindrical recess to securely receive and retain in one position the handle end of the shaft and with the gripping surface end having a plurality of axial indentations to facilitate the user's grip of the system; and a threaded fastener having a threaded portion and a head portion, the threaded portion having threads for coupling to a recipient surface upon rotation and with the head portion having a cylindrical configuration with a central stepped recess, the stepped recess having a cube-shaped interior reception area and a cube-shaped exterior reception area with the interior reception area being smaller than the exterior reception area, the interior reception area including a square flat cut face and four rectangular faces all in contact with and perpendicular to the square flat cut face of the interior reception area, the interior reception area adapted to snugly receive the working outer portion of the shaft and with the exterior reception area adapted to snugly receive the working inner portion of the shaft and alternatively, wherein the threaded fastener is of a smaller size, the working outer portion is snugly receivable by the exterior reception area of the threaded fastener.

\* \* \* \* \*